Figures 6, 7:
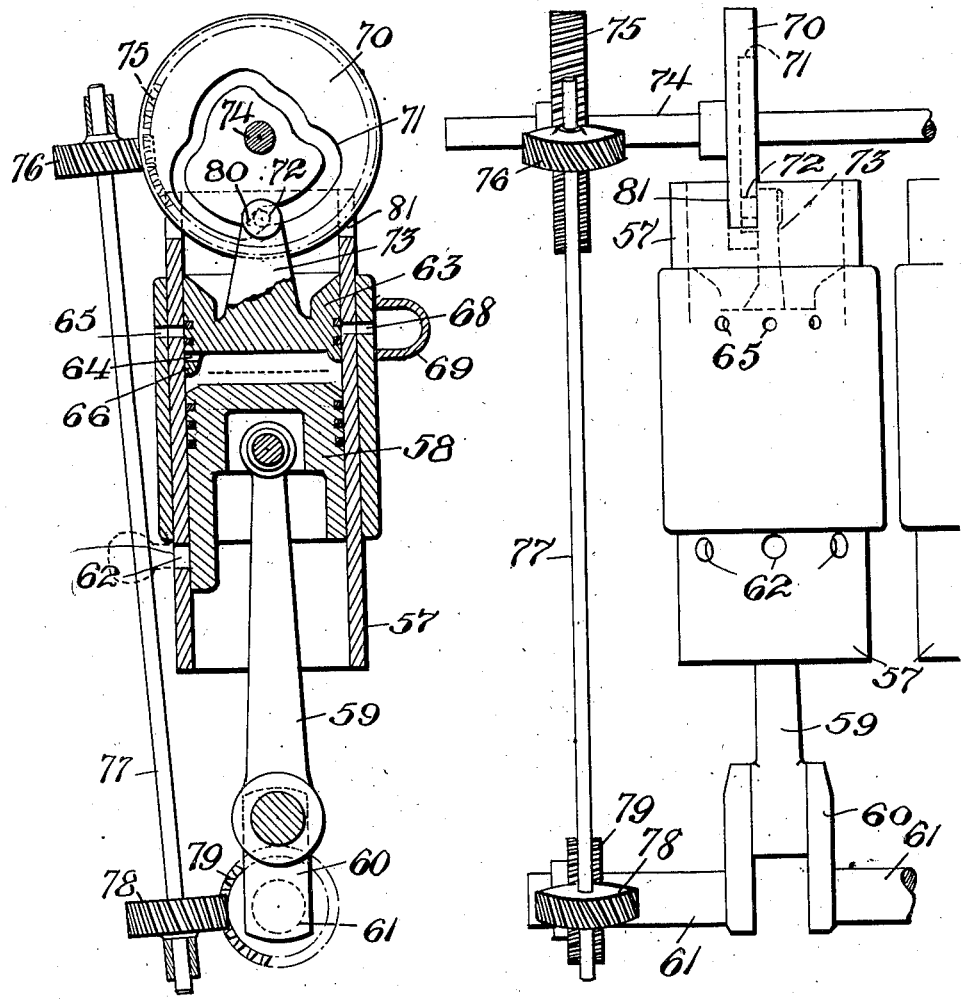

Sept. 18, 1934.    J. SCHICK    1,973,887
ENGINE
Filed June 13, 1929    2 Sheets-Sheet 1
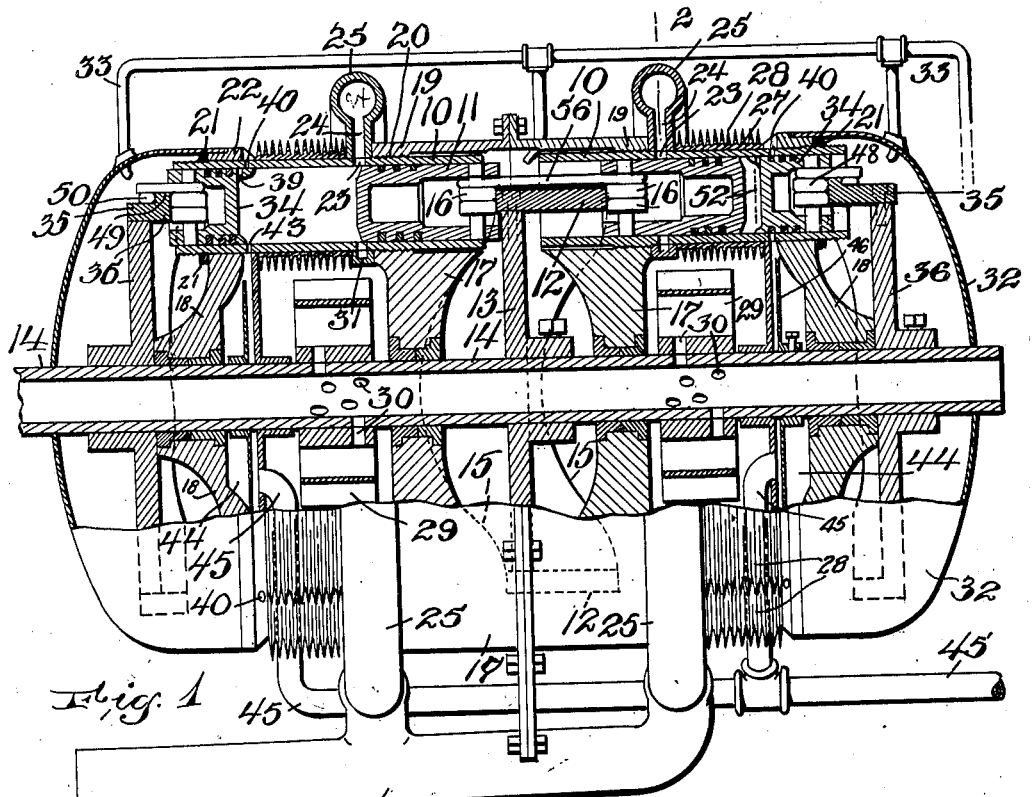
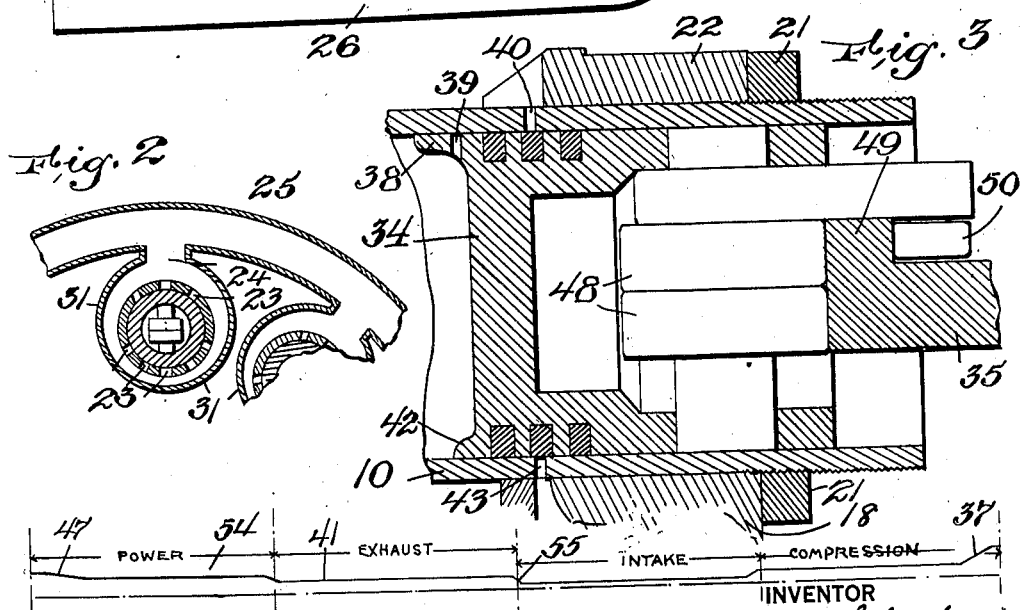
INVENTOR
Jacob Schick,
BY Wm. H. Caufield
ATTORNEY Sept. 18, 1934.  J. SCHICK  1,973,887
ENGINE
Filed June 13, 1929   2 Sheets-Sheet 2

INVENTOR
Jacob Schick,
BY
Wm H Caufield.
ATTORNEY.

Patented Sept. 18, 1934

1,973,887

UNITED STATES PATENT OFFICE 1,973,887

ENGINE

Jacob Schick, Sound Beach, Conn., assignor to Schick Dry Shaver, Inc., a corporation of Delaware Application June 13, 1929, Serial No. 370,534

1 Claim. (Cl. 123—58)

This invention relates to an improved engine in which the fuel mixture is compressed by controlled means to a point where the mixture is ignited by reason of such compression. I am aware that air has been compressed and the fuel then injected by compressed air and the fuel thus ignited. The best results in a gasoline engine are secured from high compression which is only possible, at present, through the use of volatile aviation gasoline.

Ordinary commercial gasoline has not been successfully used for the reason that it contains larger fractions of the heavier paraffines and preignites before it is compressed to the high compression desirable. I wish to utilize this high compression because the mean effective pressure increases rapidly under increased compression. For instance, with a nominal compression ratio of 4.0 the maximum brake M. E. P. is 130.5; with a ratio of 5.0 the M. E. P. is 138.0 and with a ratio of 6 the M. E. P. is 148.0.

I have therefore devised an engine in which the fuel mixture is taken into the cylinder and is compressed by the piston. As the piston arrives at the end of the compression stroke the mixture is suddenly and adequately compressed to ignite the mixture. In this manner I can use mixtures of ordinary gasoline with selected fuels and by this second and rapid and controlled compression cause the ignition by such compression alone.

The advantages of this engine are many and among them is the use in aviation of fuels that will practically eliminate the fire risks. Such fuels can be safely used without the difficulties common to the injection of such fuels at the end of the compression.

The engine is therefore designed to include a means such as a movable head for added compression at the proper time.

The object of the invention is also to provide an engine of this type, which utilizes the return action of the compression means to enable the exhaust to be accomplished at a relatively low pressure. The construction and action of the parts provides for a longer stroke on the expansion cycle than on the compression cycle.

The invention has for a further object a large initial exhaust with muffler to permit the escape of noise, heat and pressure, and an auxiliary exhaust which opens immediately after the initial exhaust to prevent back pressure and to permit the escape of the remaining burnt gases.

In observing the cylinder events in an ordinary four-stroke cycle engine it is noted that the expansion stroke does not produce its theoretical efficiency due to the opening of the exhaust before the completion of the expanding or power stroke. This is necessary to allow as near a complete clearing of burnt gases from the cylinder as possible. It is done, furthermore, to reduce the back pressure on the piston which would be present if the exhaust did not open before the end of the stroke and the piston had the work of pushing out the exhaust gases on its exhaust stroke only. Therefore, about ten per cent or say 50 degrees ahead of crank dead center the exhaust opens. The hot exhaust gases are all ejected at the hottest point in the cylinder, the combustion chamber, and add heat and pressure at this point.

In my engine, the initial exhaust is opened by the piston at the end of its stroke. The pressure is released at once into an exhaust manifold or muffler and this pressure, the noise, and the major part of the heat are at once released. The other or auxiliary exhaust now opens at the combustion end of the cylinder and the exhaust stroke of the engine is practically without any back pressure and clears the cylinder easily of its burnt gases. This latter exhaust opens directly into the air. It can do this because the fuel is entirely consumed and contains practically no carbon monoxide. By placing the initial exhaust as far as possible from the combustion chamber and delivering the gases into a muffler and by allowing the second or auxiliary exhaust to eject into the air I secure a silent engine well adapted for airplane or other purposes.

A further object of the invention is to utilize the controlled compression means as a means to regulate the auxiliary exhaust and the fuel intake ports, the main piston acting as a release of the main exhaust by uncovering it at the end of the power stroke.

The invention is illustrated in the accompanying drawings in which Figure 1 is a longitudinal section of an engine embodying my invention. Figure 2 is a section on a plane indicated by line 2 in Figure 1 and illustrating part of the adjacent cylinder. Figure 3 is an enlarged detail section of the cylinder head or compression piston and part of the cylinder. Figure 4 is a diagrammatic view of the form of cam employed to actuate the compression piston or head. Figure 5 is a detail view of a modified form of acceleration cam. Figure 6 is a sectional view showing an engine with a crank for operating the shaft and a cam connection for operating the movable head. Figure 7 is a side view of the engine shown in Figure 6.

The particular form of engine shown is not essential as many equivalents can be substituted for the parts illustrated but the Figures 1 and 2 of the drawings show a series of parallel cylinders arranged in circular relation and duplicated in opposed sets to enable the pistons to operate on a cam or other translating means common to all of them.

In Figure 1 of the drawings I show a series of cylinders 10 which are provided, each, with a piston 11. The piston in each cylinder operates against a cam 12 which translates the reciprocation of the piston into rotary motion. The cam 12 is secured to a disc 13 which in turn is fastened to the shaft 14. The shaft is thus rotated. The cam also cooperates with the pistons to force them into their respective cylinders on the compression and exhaust strokes. The cam therefore is constructed to accomplish two completed reciprocations or four strokes of a piston for one revolution of the cam. This will be evident from an inspection of the cam-surface 15 which is engaged by rollers 16 secured to the pistons and designed to reduce the friction.

The cylinders are preferably secured in standards 17 in the central part of the structure and standards 18 at the ends. These standards act to support bearings of the main shaft 14. The cylinders are preferably screwed into the bushings 19 at the top of the standards 17, the screw-threaded connection being shown at 20. Threaded rings 21 are screwed on the outer ends of the cylinders and bear against the outer ends of the upper part 22 of the standards 18. This form of structure connects the parts firmly together.

The cylinder has an exhaust port or ports 23 which is in line with an opening 24 of the exhaust pipe 25. This exhaust pipe is usually extended around the outside of the engine as shown partly in Figure 2, and when two sets of opposed cylinders are used these pipes 25, one for each set, are connected to the exhaust manifold 26. The exhaust pipe 25 also surrounds the cylinders as at 31 in order to allow for a number of exhaust ports 23. (See Figure 2.) This large initial exhaust permits the escape of noise, heat and pressure in a muffled manifold. The exhaust pipes 25 are held in place by the bushings 19 against which they abut and by the sleeves 27 which fit between the said exhaust pipes 25 and parts 22 of the outer standards 18. The sleeves 27 carry the fins 28 which assist in cooling the engine and can be supplied with air by fans 29 which receive air from the holes 30 in the hollow shaft 14, as at least one end of the shaft is left open as an air supply.

The ends of the engine are provided with suitable end pieces or shields 32 and oil pipes 33 deposit oil in selected places which oil can be taken from a sump pump and used continuously as the oil flows from the engine to the pump. This circulatory system is old and is not illustrated herein.

On the end of the cylinder opposite the piston is a means for compressing the fuel mixture quickly and to the desired extent to bring about ignition of the fuel mixture. In the drawings this means is shown as a movable head or auxiliary piston 34. It is slidable in the cylinder and is controlled by suitable means. I show a cam 35 as one means of accomplishing the sudden movement of the cylinder head. The cam 35 is mounted on a disc or spider 36 secured to the main shaft 14. The cam is shown in diagram in Figure 4 and the part 37 is sharply advanced at the end of the compression stroke to project the movable auxiliary piston 34 suddenly inwardly to accelerate the gradual compression by the main piston and ignite the fuel mixture.

The movable head or piston 34 has other functions. It has a lip 38 which has an auxiliary exhaust opening 39, which, at a point in the rearward or outward travel of the piston 34 registers with the auxiliary outlet port 40 of the cylinder. The cam holds the piston in this position at the proper time and for the proper duration by the part 41 of the face of the cam (see Figure 4). The movement outwardly of the piston or head 34 beyond the said exhaust position causes the lip 38 to cover the exhaust port 40 but it also causes the part 42 of the piston 34 to uncover the inlet port 43 of the cylinder. The inlet port admits fuel from the intake manifold 44 which is supplied by a pipe 45 from a suitable carburetor or other source of fuel supply. The intake manifold can be provided with a fin or disk 46 which revolves with the shaft 14 and agitates any fuel in the intake and keeps the fuel vaporized.

The cam 35 is provided with the part 47 which receives the impact of the auxiliary piston when the fuel is detonated and assists in the rotation of the shaft 14.

The auxiliary piston 34 is preferably provided with rollers 48 which bear on the face of the cam 35. The cam has a flanged part 49 with its rear face parallel with the front face and a roller 50 bears on the rear face thereof and is secured to the auxiliary piston or head 34. This means acts to positively withdraw the said head 34 at the proper time for exhausting through the port 40 and for admitting fuel through the port 43.

As shown in Figure 5, a stiff spring 51 can be placed in lieu of the fixed part 37 of the cam. This spring has a pressure, say, of three hundred pounds and forms an adjustable means for regulating a pre-determined pressure on the piston when it moves inwardly. This adjustment can be regulated by the size and resiliency of the spring. This spring also prevents excess pressure on the auxiliary head or piston 34.

In the operation of the engine the four cycles of each cylinder are as in an ordinary engine. The right hand cylinder at top of Figure 3 shows the main piston 11 at the end of its compression stroke. The fuel is compressed but not to the point of ignition. The part 37 of the cam 35 quickly projects the piston 34 further into the cylinder. The dotted line 52 indicates the inward movement limit of the piston or head 34. This additional movement compresses the already compressed fuel to the point of ignition. The ignited fuel then drives the piston 11 to force the cam 12 to revolve and this revolves the shaft 14. The head 34 is also projected outwardly against the part 47 of the cam 35 and this assists the driving of the shaft 14. The piston 11 at the end of its stroke uncovers the exhaust port 23 and the main exhaust takes place. In the meantime the cam surface at 54 draws the head 34 back and the head 34 provides an auxiliary exhaust through ports 39 and 40. By this time the cam 12 begins to push the piston 11 inwardly and the cylinder is scavenged through these ports.

At the completion or after the completion of this exhaust stroke of the piston 11 the cam surface 55 of the cam 35 draws the roller 50 and thus the head 34 still further back to open the inlet port 43 as it is uncovered by the end of the piston 34, the lip 42 moving beyond the part 43. The piston 11 is then moved on its intake stroke by the connection 56 with the piston in the opposite cylinder. The fuel having been drawn in by piston 11, the piston is again forced into the cylinder 10 and the compression and additional compression to cause ignition is accomplished.

The retreat of the head 34 causes the exhaust at a lower pressure than in a stationary head and the expansion stroke is longer than the compression stroke on account of this movement of the head. That is, the piston 11 is further from the head 34 at the end of the expansion stroke than it is at the beginning of the compression stroke.

In Figures 6 and 7, I illustrate an engine comprising a cylinder 57 with a piston 58 of any desired form and connected by a connecting rod 59 with the crank 60 of the main shaft 61. The main exhaust port 62 in the cylinder is uncovered by the piston at the end of its downward stroke and delivers the gases to a muffler. The movable head 63 has the opening 64 to register with the exhaust 65 when the head 63 has been raised or withdrawn to cause the part 67 to uncover the fuel inlet 68. The fuel inlet receives the fuel mixture from the intake manifold 69.

The movement of the piston is a steady reciprocation while the movable head requires a more controlled or regulated movement. The head in this construction is moved by a cam 70 having a cam groove 71 in which rides a roller 72 on the bracket 73 of the movable head 63. The cam revolves once to two complete reciprocations of the piston 58 or to two rotations of the main shaft 61. The connection for rotating the cam from the main shaft is shown as a gear connection although other forms of drive can be used. The cam is mounted on a shaft 74 having a gear 75 in mesh with a gear 76. Gear 76 is on a shaft 77. A gear 78 on the shaft 77 and in mesh with the gear 79 on the main shaft completes the drive. The gear 79 is one-half the diameter of the gear 75. The cylinder is preferably slotted as at 81 to receive the cam 70 and form a steadying and guiding element for the cam and the movable head.

In operation, this engine follows the same four-stroke cycle as in the construction shown in Figure 1 and the part 80 of the slot 71 of the cam 70 causes a quick movement of the head 63 at the end of the power stroke of the piston 58. This quick movement acting on the previously compressed fuel mixture in the cylinder causes such a relatively greater compression that the mixture in the explosion chamber is ignited.

The opening of the main exhaust port or ports 62 quickly relieves the cylinder of most of its burnt fuel without much noise as it is at low pressure due to the retreat of both piston and movable head. Then the exhaust on the exhaust stroke completes the ejection of burnt gases. This exhaust at one end of the stroke and continued to the end of the next stroke adds much to the efficiency of the engine.

I claim:—

An internal combustion engine comprising a cylinder, a piston in the cylinder, a slidable head in the cylinder, the cylinder having an exhaust port uncovered by the piston and having an inlet port and an exhaust port controlled by the movable head, the said head having a flange with a passage to register with said latter exhaust port, and means for moving the head inwardly to compress the fuel to the point of ignition and for moving it outwardly to control the inlet and exhaust ports.

JACOB SCHICK.